(12) United States Patent
Han

(10) Patent No.: US 9,499,103 B2
(45) Date of Patent: Nov. 22, 2016

(54) DISPLAY ROOM MIRROR

(71) Applicant: LG INNOTEK CO., LTD., Seoul (KR)

(72) Inventor: Tae Hoon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 473 days.

(21) Appl. No.: 14/035,985

(22) Filed: Sep. 25, 2013

(65) Prior Publication Data

US 2014/0085913 A1 Mar. 27, 2014

(30) Foreign Application Priority Data

Sep. 27, 2012 (KR) .................. 10-2012-0108096

(51) Int. Cl.
*B60R 1/12* (2006.01)
*B60R 1/08* (2006.01)
*G02F 1/157* (2006.01)
*B60R 1/04* (2006.01)

(52) U.S. Cl.
CPC . *B60R 1/12* (2013.01); *B60R 1/04* (2013.01); *B60R 1/088* (2013.01); *G02F 1/157* (2013.01); *B60R 2001/1253* (2013.01)

(58) Field of Classification Search
CPC . B60R 1/088; B60R 1/12; B60R 2300/8066; B60R 2011/0033; B60R 1/02; B60R 2300/8026; B60R 1/025; B60R 2300/806; B60R 2300/8093; B60R 1/086; B60Q 1/2665; B60Q 1/22; B60Q 3/023; B32B 2551/08; B32B 17/10174; B32B 2605/00; G02B 5/08; G02B 27/0093; G02B 27/142; G02B 7/182; G02F 1/163; B29L 2011/0058; B29L 2031/30; F21K 9/30; F21S 48/215; F21Y 2103/003; G08G 1/16; B60K 2350/927; G06F 3/013
See application file for complete search history.

(56) References Cited

U.S. PATENT DOCUMENTS

| | | | | |
|---|---|---|---|---|
| 5,076,673 A | * | 12/1991 | Lynam | G02F 1/163 |
| | | | | 359/265 |
| 5,724,187 A | | 3/1998 | Varaprasad et al. | |
| 6,356,376 B1 | * | 3/2002 | Tonar | B60Q 1/2665 |
| | | | | 359/265 |
| 2002/0003571 A1 | * | 1/2002 | Schofield | B60C 23/00 |
| | | | | 348/148 |
| 2004/0160657 A1 | | 8/2004 | Tonar et al. | |

OTHER PUBLICATIONS

European Search Report in International Application No. 13186312 dated Oct. 25, 2013.

* cited by examiner

*Primary Examiner* — Stephen F Husar
*Assistant Examiner* — Danielle Allen
(74) *Attorney, Agent, or Firm* — Saliwanchik, Lloyd & Eisenschenk

(57) ABSTRACT

Provided is a display room mirror, including a room mirror disposed in an inner part of a vehicle to detect a rear situation of the vehicle; and an organic light emitting diode (OLED) panel formed in a part or an entire part of a front surface of the room mirror, thereby improving a contrast and a reaction velocity and reducing a thickness and a weight of the room mirror.

17 Claims, 3 Drawing Sheets

DISPLAY ROOM MIRROR

CROSS-REFERENCE TO RELATED APPLICATION

This application claims the benefit under 35 U.S.C. §119 of Korean Patent Application No. 10-2012-0108096, filed Sep. 27, 2012, which is hereby incorporated by reference in its entirety.

BACKGROUND

Field of the Invention

Embodiments of the present invention relate to a room mirror for a vehicle, more specifically, to a display room mirror capable of improving a contrast and a reaction velocity by disposing an OILED panel on a front surface of the room mirror.

Description of the Related Arts

Recently, a device which generates warning sounds to call a driver's attention when a vehicle comes close to an obstacle has been provided in the vehicle, and thus when the vehicle comes close to the obstacle, an obstacle warning device for giving the driver information on the situation has been installed so that a collision of the vehicle and the backward obstacle can be inhibited in advance. As illustrated in FIG. 1, a display module is disposed on a rear surface of a room mirror 10 and outputs images showing surrounding situations of the vehicle captured by a camera mounted to the outside of the vehicle so that the driver can confirm the images, thereby contributing to safe driving.

In particular, an LCD module 20 is applied as a conventional display module as shown in FIG. 1. In the case where the HID module 20 is applied, it is problematic that a contrast and a reaction velocity are low. Also, since the LCD module 20 is large in size, a thickness of a room mirror 10 is increased and a weight fit thereof is also increased.

BRIEF SUMMARY

Embodiments of the present invention have been made keeping in mind the above problems occurring in the related art. An aspect of the embodiments of the present invention provides a display room mirror capable of improving a contrast and a reaction velocity and reducing a thickness and a weight of a room mirror by forming an OLED panel on a front surface of the room mirror.

According to an aspect of the embodiments of the present invention, there is provided a display room mirror including: a room mirror installed in an inner part of a vehicle to detect a rear situation of the vehicle; and an organic light emitting diode (OLED) panel formed in a part or an entire part of a front surface of the room mirror.

According to the present invention, the OLED panel is formed on the front surface of the room mirror so that the contrast and the reaction velocity can be improved, and the thickness and weight of the room mirror can be reduced.

Furthermore, as the transparent OLED panel is formed at a front surface of an electrochromic mirror, a production process of the room mirror can be simplified, a reduction in reflectance can be inhibited from being generated from a reflective layer of the electrochromic mirror.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Exemplary embodiments according to the present invention will now be described more fully hereinafter with reference to the accompanying drawings. The exemplary embodiments of the present invention may, however, be embodied in many different forms and should not be construed as limited to the embodiments set forth herein. Rather these example embodiments are provided so that this disclosure will be thorough and complete, and will fully convey the scope of the invention to those skilled in the art. Furthermore, when it is determined that specific descriptions regarding publicly known relevant functions or configurations may unnecessarily be beside main points of the present invention, the corresponding descriptions are omitted. It will be further understood that terms used herein should be interpreted as having a meaning that is consistent with their meaning in the context of this specification. With regard to the elements which perform similar functions and operations, like numbers refer to like elements through the specification.

The gist of the present invention is to provide a display room mirror capable of reducing a thickness and a weight of a room mirror and improving a contrast and a reaction velocity by disposing an organic light emitting diode (OLED) panel on a front surface of the room mirror.

Figure 1:
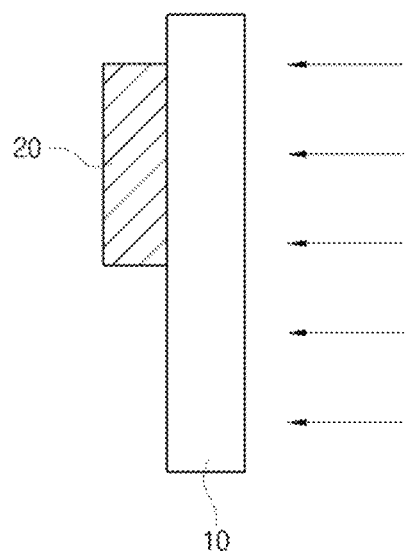
FIG. 1 is a side view illustrating a structure in which a conventional LCD module is disposed on a rear surface of a room mirror.
Figure 2:
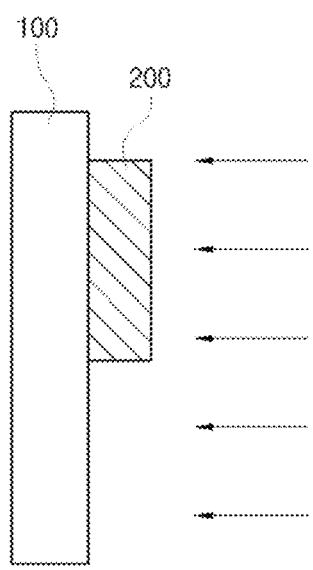
FIG. 2 is a side view illustrating a structure in which an OLED panel is disposed on a front surface of a room mirror according to one embodiment of the present invention.

FIG. 2 is a side view illustrating a structure in which an OLED panel is disposed on a front surface of a room mirror according to one embodiment of the present invention.

Referring to FIG. 2, a display room mirror according to the present embodiment of the invention may include: a room mirror 100 disposed in an inner part of a vehicle to detect a rear situation of the vehicle; and an organic light emitting diode (OLED) 200 formed in a part or an entire part of a front surface of the room mirror 100.

The room mirror 100, which is a mirror mounted to enable a driver to secure his or her rear visual field in the inner part of the vehicle, may be composed of a general mirror or a half mirror having both properties of transmitting and reflecting light forward. In particular, the room mirror may be composed of an electrochromic mirror (ECM) which changes reflectance of the room mirror 100 so as to inhibit a driver's glariness generated due to reflection of light from a headlight of a rear vehicle.

More specifically, the electrochromic mirror (ECM) 300 changes reflectance of the room mirror 100 using the redox reaction of an EC (Electro chromatic) device depending on a difference in brightness of light measured by a sunlight sensor such as a photo diode measuring brightness of the front and the rear of the vehicle. Thus, the driver's glariness caused by the headlight of the rear vehicle is controlled, thereby contributing to safe driving. A detailed structure of the electrochromic mirror will be explained in the sections below regarding FIG. 4 and FIG. 5.

The OLED panel 200 is mounted to the part or the entire part of the front surface of the room mirror 100 and provides the driver with images around the vehicle captured by a camera mounted to the outside of the vehicle. More specifically, in the electrochromic mirror 100 which will be explained hereinafter, the OLED panel 200 is formed on one surface of both surfaces of a first transparent substrate in which a first transparent electrode is not formed, namely, a surface to which light is incident from the outside. In general, the OLED panel 200 includes a transparent substrate; a lower electrode (anode electrode) sequentially laminated on the transparent substrate to form a pixel; an organic light emitting layer, an upper electrode (cathode electrode).

Also, in order to increasingly improve light emitting efficiency, a hole injection layer and a hole transport layer may be formed between the lower electrode and the light emitting layer, an electron injection layer and an electron transport layer may be formed between the organic light emitting layer and the upper electrode, and a thin film transistor (TFT) for pixel switching may be provided on the transparent substrate.

The OLED panel 200 has a structure in which positive holes injected from the anode electrode and electrons injected from the cathode electrode are connected to each other at the organic light emitting layer to form an exciton, and the exciton emits light while releasing energy. Thus, since a separate light source is required for the OLED panel (200), a volume and a weight of the device can be reduced, the device can be driven at a low voltage, and can have the wide field of view and a rapid reaction velocity. According to a driving method, the OLED panel 200 may be divided into a passive matrix OLED (PM-OLED) and an active matrix OLED (AM-OLED). The PM-OLED has a simple structure in which light is emitted from an area where two electrodes cross each other, and the AM-OLED has a structure in which befit is emitted by driving currents to each pixel using the thin film transistor. The OLED panel 200 according to the present embodiment of the invention includes both the PM-OLED and the AM-OLED.

At this time, the OLED panel 200 may be a transparent OLED panel. As a result, when an OELD does not operate, the transparent OLED panel may perform the function of the room mirror capable of detecting a rear situation. A structure of the transparent OLED panel will be explained in the sections below regarding FIG. 3.

As such, as the OLED panel 200 is formed on the front surface of the room mirror 100, the contrast and the reaction velocity can be improved, and the thickness and weight of the room mirror can be reduced.

In particular, when the conventional LCD module is disposed on a rear surface of the electrochromic mirror, because an LCD is located at the rear surface of the reflective layer of the electrochromic mirror, the reflective layer of a cell to which the LCD is attached is formed of a thin reflective material in thickness compared to different areas so that the brightness of light emitted from the LCD is not reduced by the reflective layer, and reflectance of the entire reflective layer is reduced, thereby causing a problem of lowering a property of the electrochromic mirror. Thanks to the element of the present embodiment of the invention wherein the transparent OLED panel 200 is disposed on the front surface of the electrochromic mirror 100 of the room mirror, this problem can be solved.

Figure 3:
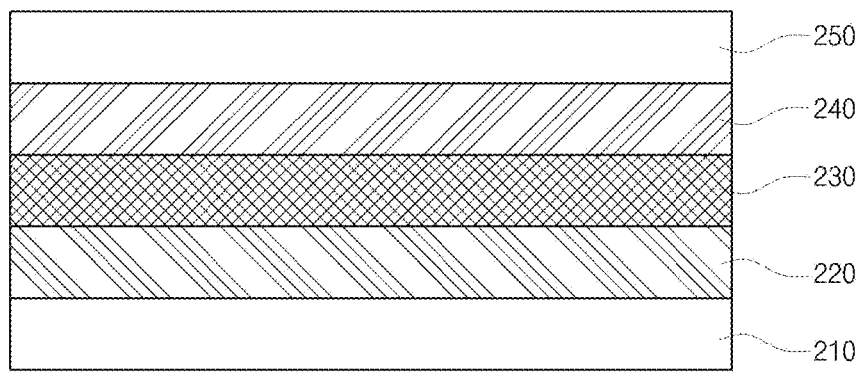
FIG. 3 is a view illustrating a schematic structure of a transparent OLED panel according to another embodiment of the present invention.

FIG. 3 is a view illustrating a schematic structure of the transparent OLED panel according to another embodiment of the present invention.

Referring to FIG. 3, the transparent OLED panel 200 disposed on the front surface of the room mirror is configured such that a lower transparent electrode 220, an organic light emitting layer 230, an upper transparent electrode 240 and a sealing glass 250 are sequentially formed on a glass substrate 210.

At this time, the lower and upper transparent electrodes 220, 240 may be formed of any one of a metal oxide-based electrode containing Ag, a metal thin-film electrode containing Ag, Au, Cu and CNT, a polymer electrode containing PEDOT:PSS, and a multilayer thin-film electrode composed of a dielectric-metal-dielectric. These materials of the transparent electrodes 220, 240 are only examples. It would be obvious to those having ordinary skill in the an that all the materials which can be used as the transparent electrodes 220, 240 may be used.

Also, as described in the section regarding FIG. 2, in order to increasingly improve the light emitting efficiency, the hole injection layer and the hole transport layer may be formed between the lower transparent electrode 220 and the organic light emitting layer 230, and the electron injection layer and the electron transport layer may be formed between the organic light emitting layer 230 and the upper transparent electrode 240. Moreover, a unimolecular substance such as Alq3, Anthracene, and the like, and a high molecular substance such as poly(p-phenylenevinylene) (PPV), polythiophene (PT) and the like may be used for the organic light emitting layer 230.

Figure 4:
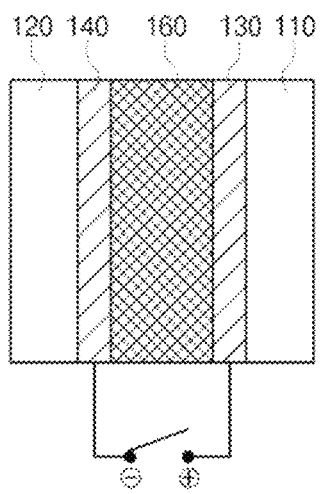
FIG. 4 and FIG. 5 are views illustrating schematic structures of an electrochromic mirror according to still another embodiment of the present invention.
Figure 5:
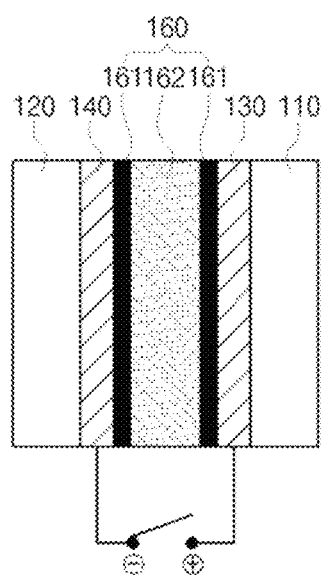

FIG. 4 and FIG. 5 are views illustrating schematic structures of an electrochromic mirror according to still another embodiment of the present invention.

Referring to FIG. 4, the electrochromic mirror (ECM) 100 may be configured to include: a first substrate 110 and a second substrate 120 facing each other at a predetermined distance; an electrode 130 and a conductive reflection layer 140 formed on facing surfaces of the first and second substrate 110, 120, respectively; and an electrochromic layer 160 formed between the electrode 130 and the conductive reflection layer 140.

An electrochromic material capable of undergoing the reversible changes of optical properties by an electrochemical oxidation-reduction reaction is used for the electrochromic mirror 100. The electrochromic material does not have a color when an electrical signal is not applied from an external source, and then has a certain color when the electrical signal is applied, thereby controlling reflectivity of a room mirror 300.

The first substrate 110 and the second substrate 120 may be a glass substrate. However, it is not limited thereto. They may be composed of a transparent material such as silicon, synthetic resin, aerogel and the like.

The electrode 130 may be formed of a transparent electrode. The electrode 130 may be laminated on the first substrate 110, and may be any one selected from the group consisting of indium doped tin oxide (ITO), fluor doped tin oxide (FTO), aluminum doped zinc oxide (AZO), galium doped zinc oxide (GZO), antimony doped tin oxide (ATO) indium doped zinc oxide (IZO), niobium doped titanium oxide (NTO). ZnO, and a combination thereof. However, this is only an example, but is not limited.

The conductive reflection layer 140 may be formed on the second substrate 120 and may serve, as a reflective plate which reflects incident light by passing through the electrochromic layer 160, and a counter electrode of the electrode 130. The conductive reflection layer 140 may be made of at least one metal selected from the group consisting of Cu, Au, Ag, Ni, Al, Cr, Ru, Re, Pb, Sn, In, and Zn, or an alloy containing these metals. However, this is only an example, but is not limited.

Also, although it is not illustrated in the drawings, the conductive reflection layer 140 may be composed of two layers such as a second transparent electrode and a reflective layer. That is, the electrode 130 (hereinafter referred to as "the first transparent electrode") may be composed of the second transparent electrode which serves as a counter electrode of the first transparent electrode, and the reflective layer which serves as a reflective plate reflecting incident light. At this time, the second transparent electrode may be composed of any one selected from the group consisting of indium doped tin oxide (ITO), fluor doped tin oxide (FTO), aluminum doped zinc oxide (AZO), galium doped zinc oxide (GZO), antimony doped tin oxide (ATO), indium doped zinc oxide (IZO), niobium doped titanium oxide (NTO), ZnO, and a combination thereof. The reflective layer may be composed of at least one metal selected from the group consisting of Cu, Au, Ag, Ni, Al, Cr, Ru, Re, Pb, Sn, In, and Zn, or an alloy containing these metals.

The electrochromic layer 160 is composed of a liquid or solid electrochromic material and an electrolyte, is formed between the first transparent electrode 130 and the conductive reflection layer 140, and is colored and decolorized through an oxidation reaction or a reduction reaction by receiving electricity applied from the first transparent electrode 130 and the conductive reflection layer 140. The electrochromic layer 160 may be formed using a vacuum bonding method which is performed in such a manner as to inject the electrochromic material and the electrolyte into a gap between the first transparent electrode 130 and the conductive reflection layer 140. The electrochromic material may be an organic electrochromic material or an inorganic electrochromic material. The organic electrochromic material may be composed of viologen, anthraquinone, polyaniline, polypyrrole or polythiophene, and the inorganic electrochromic material may be $WO_3$, $MoO_3$, $CeO_2$, $MnO_2$ or $Nb_{2O5}$.

At this time, when the electrochromic material may be in a solid state, the electrochromic layer 160 may include an electrolyte layer 162 and an electrochromic coating layer 161 formed on one surface of both surfaces of the electrolyte layer 162. That is, as illustrated in FIG. 5, the electrochromic coating layer 161 may be formed on both surface of the electrolyte layer 162, may be formed only between the electrolyte 162 and the first transparent electrode 130 even though this is not illustrated in the drawing, and may be formed only between the electrolyte 162 and the conductive reflection layer 140. Furthermore, when a thickness of the electrochromic coating layer 161 is less than 100 nm, it would be difficult to show a special function of the electrochromic material, and when the thickness exceeds 700 nm, the problem of durability such as the generation of a crack is generated. Accordingly, the thickness of the electrochromic coating layer 161 may be formed in the range of from 100 nm to 700 nm without being limited thereto.

When the electrochromic material is in a liquid state, uniform discoloration is not performed, and in order to maintain an electrochromic state, a voltage should be continuously applied, thereby causing high power consumption. However, when the electrochromatic coating layer 161 is formed in the solid state as described above, this enables uniform discoloration and decolorization to be performed. Also, since the electrochromic material has a memory effect, a voltage is applied only upon the discoloration and decolorization, and thus the electrochromic material consumes a small amount of power. Furthermore, since a voltage is applied upon the decolorization, the speed of a decolorization reaction is fast, and since the electrochromic material to which a coating process is applied is an inorganic or organic polymer, durability of the device can be improved.

As such, since the oxidation-reduction reaction of the electrochromic device is used depending on the brightness of light to change reflectance of the room mirror 100, the glariness of drivers can be controlled.

In addition to the aforesaid exemplary embodiment wherein the electrode 130 is formed on the facing surface 110 of the first substrate and the second substrate 120, and the first electrochromic coating layer coated with the electrochromic material is formed on the electrode 130, in still further another exemplary embodiment of the present invention, a second electrochromic coating layer coated with the electrochromic material may be further formed on the conductive reflection layer 140.

As the electrode and the conductive reflection layer interposed between the two substrates, and the first and second electrochromic coating layers interposed between the electrode and the conductive reflection layer are formed, uniform discoloration and decolrization can be realized, small power consumption can be implemented, and the electrochromic device having a fast decolorization reaction velocity can be embodied.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A display room mirror, comprising
   an electrochromic mirror disposed in an inner part of a vehicle to detect a rear situation of the vehicle; and
   an organic light emitting diode (OLED) panel formed in a part or an entire part of a front surface of the electrochromic mirror,
   wherein the electrochromic mirror comprises:
   two substrates facing each other;
   an electrode and a conductive reflection layer interposed between the two substrates; and
   an electrochromic layer interposed between the electrode and the conductive reflection layer and containing an electrochromic material and an electrolyte, and wherein the electrochromic layer comprises:
   an electrolyte layer interposed between the electrode and the conductive reflection layer; and
   an electrochromic coating layer formed on at least one surface of the electrolyte layer.

2. The display room mirror of claim 1, wherein the two substrates are a first substrate and a second substrate facing each other and made of a transparent material.

3. The display room mirror of claim 2, wherein any one of the first substrate and the second substrate is made of a transparent film material.

4. The display room mirror of claim 3, wherein the transparent film material is any one of polyethylene terephthalate (PET), polycarbonate (PC), an acrylonitrile-butadiene-styrene copolymer (ABS), polymethyl methacrylate (PMMA), polyethylene naphthalate (PEN), polyether sulfone (PES), a cyclic olefin copolymer (COC), a triacetylcellulose (TAC) film, a polyvinyl alcohol (PVA) film, a polyimide (PI) film, and polystyrene (PS).

5. The display room mirror of claim 1, wherein the OLED panel is formed on a rear surface of one surface of the first substrate in which the first electrode is formed.

6. The display room mirror of claim 1, wherein the OLED panel is a transparent OLED panel.

7. The display room mirror of claim 6, wherein the transparent OLED panel comprises: a glass substrate; a lower transparent electrode formed on the glass substrate; an organic light emitting layer formed on the lower transparent electrode; an upper transparent electrode formed on the organic light emitting layer; and a sealing glass formed on the upper transparent electrode.

8. The display room mirror of claim 1, wherein the electrochromic coating layer is coated with an organic material or an inorganic material.

9. The display room mirror of claim 8, wherein the organic material contains any one selected from the group consisting of viologen, anthraquinone, polyaniline, polyphenol and polythiopene.

10. The display room mirror of claim 8, wherein the inorganic material contains any one selected from the group consisting of $WO_3$, $MoO_3$, $CeO_3$, $MnO_2$, and $Nb_2O_5$.

11. The display room mirror of claim 8, wherein the electrochromic material is formed by mixing a liquid electrochromic material and an electrolyte.

12. The display room mirror of claim 8, wherein the electrochromic material comprises a solid electrochromic coating layer and a liquid electrolyte layer.

13. The display room mirror of claim 1, further comprising a second electrochromic coating layer formed between the electrolyte layer and the conductive reflection layer.

14. The display room mirror of claim 13, wherein the second electrochromic coating layer is coated on a substrate in which the conductive reflection layer is formed.

15. The display room mirror of claim 1, wherein the electrode is a transparent electrode.

16. The display room mirror of claim 15, wherein the electrode is any one selected from the group consisting of indium doped tin oxide (ITO), aluminum doped zinc oxide (AZO), galium doped zinc oxide (GZO), antimony doped tin oxide (ATO), fluorine doped tin oxide (FTO), indium doped zinc oxide (IZO), niobium doped titanium oxide (NTO), ZnO, and any combination thereof.

17. The display room mirror of claim 15, wherein the conductive reflection layer is at least one metal selected from the group consisting of Cu, Au, Ag, Ni, Al, Cr, Ru, Re, Pb, Sn, In, and Zn, or an alloy containing these metals.

* * * * *